(12) United States Patent
Zheng (10) Patent No.: US 9,665,706 B2
(45) Date of Patent: May 30, 2017

(54) PASSWORD CREATING METHOD AND DEVICE

(71) Applicants: Smart Electronic Industrial (Dong Guan) Co., Ltd., Dongguan (CN); Li Zheng, Dongguan (CN)

(72) Inventor: Li Zheng, Dongguan (CN)

(73) Assignees: Smart Electronic Industrial (Dong Guan) Co., Ltd. (CN); Li Zheng (CN)

( * ) Notice: Subject to any disclaimer, the term of this patent is extended or adjusted under 35 U.S.C. 154(b) by 0 days.

(21) Appl. No.: 15/166,529

(22) Filed: May 27, 2016

(65) Prior Publication Data

US 2016/0350527 A1   Dec. 1, 2016

(30) Foreign Application Priority Data

May 28, 2015 (CN) .......................... 2015 1 0281884

(51) Int. Cl.
*G06F 21/36* (2013.01)
*G06F 21/46* (2013.01)
*G06F 3/0488* (2013.01)
*G06F 3/0489* (2013.01)
*G06F 21/83* (2013.01)

(52) U.S. Cl.
CPC ............ *G06F 21/36* (2013.01); *G06F 3/0489* (2013.01); *G06F 3/04883* (2013.01); *G06F 3/04886* (2013.01); *G06F 21/46* (2013.01); *G06F 21/83* (2013.01)

(58) Field of Classification Search
None
See application file for complete search history.

(56) References Cited

U.S. PATENT DOCUMENTS

| 7,698,563 B2 * | 4/2010 | Shin | G06F 21/36 713/184 |
| 8,881,251 B1 * | 11/2014 | Hilger | H04L 63/083 713/183 |
| 9,390,249 B2 * | 7/2016 | Leahy | G06F 21/36 |
| 2003/0204724 A1 * | 10/2003 | Ayyagari | G06F 21/445 713/168 |

(Continued)

FOREIGN PATENT DOCUMENTS

| DE | 10118209 A1 * | 10/2002 | ............. G06F 21/36 |
| KR | WO 2004057516 A1 * | 7/2004 | ............. G06F 21/36 |

*Primary Examiner* — Benjamin Lanier
(74) *Attorney, Agent, or Firm* — Lerner, David, Littenberg, Krumholz & Mentlik, LLP (57) ABSTRACT

A password creating device and method is provided. In this method, two keyboard layouts are employed. Each key location of each layout is mapped onto an information unit comprising a plurality of information elements. The information units are different from each other among a specific layout. The two keyboard layouts are displayed, and two series of key location selections based on the respective keyboard layouts are received to obtain two information unit sequences. The two series of information units are compared with each other in accordance with the order of occurrence of each information element, an information element shared by two corresponding information units associated with a same key location is taken as an information element selected by the user as part of his password, and a password is created by joining all of the shared information elements together in sequence.

28 Claims, 7 Drawing Sheets

(56) References Cited

U.S. PATENT DOCUMENTS

| | | | |
|---|---|---|---|
| 2005/0028009 A1* | 2/2005 | Neff | H04L 9/0825 726/4 |
| 2007/0074271 A1* | 3/2007 | Camara | G06F 21/36 726/2 |
| 2007/0266428 A1* | 11/2007 | Downes | G06F 21/36 726/5 |
| 2008/0244700 A1* | 10/2008 | Osborn | G06F 21/36 726/2 |
| 2009/0037986 A1* | 2/2009 | Baker | G06F 21/31 726/5 |
| 2013/0097697 A1* | 4/2013 | Zhu | G06F 21/36 726/18 |
| 2014/0068754 A1* | 3/2014 | Burkill | G06F 21/36 726/18 |
| 2015/0121467 A1* | 4/2015 | Yun | G06F 21/46 726/4 |
| 2015/0178490 A1* | 6/2015 | Tamboly | G06F 21/46 726/4 |
| 2015/0205942 A1* | 7/2015 | Yang | G06F 21/31 726/19 |
| 2015/0312040 A1* | 10/2015 | Zheng | H04L 9/3231 713/183 |

* cited by examiner

PASSWORD CREATING METHOD AND DEVICE

CROSS-REFERENCE TO RELATED APPLICATIONS

The present application claims priority from Chinese Application No. 201510281884.7 filed May 28, 2015, the disclosure of which is hereby incorporated herein by reference.

FIELD OF THE INVENTION

The present invention relates to technology of electronic safety protection and more particularly, to a password creating method and a password creating device for performing the same method.

BACKGROUND OF THE INVENTION

With development of society, kinds of safety problems occur increasingly, and accordingly, users pay more attention to security. Nowadays mobile terminals such as smart phones or tablet computers are widely used. Creating a strong password and maintaining a password protection of private documents are often required to these terminals, and all these actions involve secure password creation. Accordingly, safely creating passwords becomes very important, and application of the same to aspects of life and work has been found gradually. For example, to a mobile terminal, a display screen based on touch-feedback principles is generally provided. Password creating may be done by inputting numbers, letters, or other characters through touching of the keys. It might also be done by capturing the photo of a specific person's face, or drawing a particular pattern in a nine-grid screen. All of these methods suffer from serious drawbacks. For example, inputting by touching the keys and drawing the pattern in the nine-grid screen are subject to being seen by others and then being cracked. Creating a password by taking a photo of the user can possibly be cracked by a static graphics. Apparently, these prior art methods all lack sufficient security and reliability.

SUMMARY OF THE INVENTION

One major object of the invention is to provide a password creating method and a corresponding password creating device based on the same method, featuring high concealment and security.

To obtain the above objection, a password creating method is proposed which includes the following steps:

providing a first keyboard layout and a second keyboard layout, each keyboard layout having a plurality of key locations, each key location being mapped to an information unit consisted of a plurality of information elements, one information unit corresponding to a specific key location of the first keyboard layout being different from another information unit corresponding to a specific key location of the second keyboard layout;

displaying the two keyboard layouts, and receiving two series of key locations selection based on respective keyboard layouts to obtain two information unit sequences;

comparing two series of information units with each other in accordance with occurrence order of each information element, taking an information element shared by two corresponding information units associated with a same key location as an information element selected by the user as part of his password, and creating a password by joining all of the shared information elements together in sequence.

Preferably, the plural information elements corresponding to a specific key location of the first keyboard layout are randomly mapped into different key locations of the second keyboard layout.

Preferably, the first keyboard is displayed in a same user interface prior to displaying of the second keyboard layout so that two series of key locations are selected.

Preferably, an information unit mapped onto a specific key location of a corresponding keyboard layout is indicated in the same key location.

Preferably, the information units are displayed as graphics or collection of coded information elements in the user interface at locations corresponding to key locations of the keyboard layout.

Preferably, each information unit includes at least two information elements.

Optionally, the information elements are any one or a combination of character, color, font, font size, graphics, or pattern.

Optionally, different information units have the same or different number of information elements.

Preferably, different information unit corresponding to a specific key location of a specific keyboard layout has different information elements.

Preferably, the information units of corresponding key locations of a corresponding keyboard layout are shown in the user interface in a static manner.

Preferably, the information units of corresponding key locations of a corresponding keyboard layout are shown in the user interface in a dynamic manner.

Preferably, selection of a specific key location by the user results in a click event to the same key location.

Preferably, the user interface is provided by a touch screen display.

A password creation device for realizing above method, includes:

a control unit for executing a program embodying the method;

a storage unit for storing candidate intermediate data and resulted data during running of the method; and a touchscreen display for providing said plural key locations and for receiving selection of the key locations by the user and transforming the selection into a command of selecting information units corresponding to respective key locations.

A password creating method includes the following steps:

providing a first keyboard layout and second keyboard layout both of which have a mapping relationship with a same physical keyboard, each keyboard layout having the same key locations as those of the physical keyboard, each key location being corresponded to an information unit consisted of several information elements, one information unit corresponding to a specific key location of the first keyboard layout being different from another information unit corresponding to a specific key location of the second keyboard layout;

displaying the two keyboard layouts and receiving two series of key locations selection based on respective keyboard layouts by the physical keyboard to obtain two information unit sequences; and comparing the two series of information units with each other in accordance with occurrence order of each information element, taking an information element shared by two corresponding information units associated with a same key location of the physical keyboard as an information element selected by the user as part of his password, and creating a password by joining all of the shared information elements together in sequence.

Preferably, the first keyboard is displayed in a same user interface prior to displaying of the second keyboard layout so that corresponding key locations of the physical keyboard are selected by the user based on displayed keyboard layout.

Preferably, when displaying the two keyboard layouts, information units with a mapping relationship with the corresponding key locations of the physical keyboard are displayed.

Preferably, the information units each are displayed as graphics or collection of coded information elements in the user interface of the display screen at locations corresponding to key locations of the physical keyboard.

Preferably, the plural information elements corresponding to a specific key location of the first keyboard layout are randomly mapped into different key locations of the second keyboard layout.

Preferably, each information unit includes at least two information elements.

Optionally, the information elements are any one or a combination of character, color, font, font size, graphics, or pattern.

Optionally, different information units have the same or different number of information elements.

Preferably, different information unit corresponding to a specific key location of a specific keyboard layout has different information elements.

Preferably, selection of a specific key location of the physical keyboard is resulted by key-down or key-up events.

Preferably, the key locations of each keyboard layout are associated with a plurality of input circuits; and Switching on of each input circuit represents selection of an information unit listed in a display region corresponding to the same input circuit.

A password creation device for realizing above method includes:

a control unit for executing a program embodying the method;

a storage unit for storing candidate intermediate data and resulted data during running of the method;

a physical keyboard for providing a plural key locations and for receiving selection of the key locations by the user and transforming the selection into a command of selecting information units corresponding to respective key locations; and a display for providing display regions corresponding to the key locations respectively and for displaying information units having a mapping relationship with the respective key locations.

Compared to prior art, the embodiments of the instant invention bears the following good effects:

At first, a set of information elements are by default or randomly divided into plural information units each including at least information elements. In addition, each information unit is shown in a user interface at locations corresponding to the key locations of respective keyboard layout. Selection of specific key locations by the user is received. As such, selection of a specific key location by the user is mapped onto a specific information unit containing multiple information elements. Moreover, each time the user performs selection, the arrangement and combination of the information elements indicated in one display region may be different from those indicated in another display region, thus improving fuzziness of chosen information elements. Even in case those selection actions of the user have been seen by others, the true password sequence is still unknown to others, thereby enhancing security of the password creation process.

Secondly, these information units are randomly arranged and displayed in the user interface and therefore, fuzziness of password creation process is further enhanced. The password sequence set by the user may be determined simply by comparison of two series of information sequences, thus improving efficiency of password setting process.

DETAILED DESCRIPTION OF THE INVENTION

Various embodiments of the invention are described below in greater detail. The examples of these embodiments are illustrated in the drawings. Throughout the drawings, same or similar numerals are used to refer to the same or similar elements or those having the same or similar function. The description of the embodiments in conjunction with the drawings is only exemplary for explaining the principle of the invention and is not to be interpreted to limit the invention.

It should be understood by persons of ordinary skill in the art that unless otherwise specified, terms "a", "one", "the" and "said" in singular form may also be used in plural form. It should be further understood that the term "include" as used herein means the presence of said features, integers, steps, operations, elements, and/or components, but not excluding the presence of one or more additional other feature, integer, step, operation, element and/or component and/or their combination. The term "and/or" includes one or more related elements and all combination thereof.

It should be understood by a person of ordinary skill in the art that unless otherwise specified, all the terminology (including technical and scientific terms) have their ordinary meaning as understood by persons of the art.

It should also be understood by a person of the ordinary skill in the art that the device (or terminal, or terminal device) of the invention may include a device of a wireless signal receiver capable of only receiving signals while not being capable of transmitting signals. It may also include devices capable of receiving and transmitting signals. Examples include cellular devices or other communication devices, cellular devices or other communication devices with single line or multiple-line display(s) or without multiple-line display(s), PCS (Personal Communications Service) with the ability of processing voice, data, fax and/or data communications; PDA (Personal Digital Assistant) including radio frequency receivers, pagers, internet/intranet accessible devices, network browsers, notepads, or calendars, GPS (Global Positioning System) receivers; laptop and/or palmtop computers, and/or other devices that include a radio frequency receiver. The device may be portable, transportable, or installable into a vehicle (aviation, shipping and/or land), and may be configured to be operated in a given location, and/or a distributed location, or be operated on earth and/or any other location in space. The device may also include a communication terminal, internet access terminal, music/video play terminal such as a PDA and/or mobile phone, or a smart TV, top box and the like.

The storage, storage unit or storage device as presented in this disclosure is used for storing the password, and functions as the source of the password. The storage space is not limited to the local storage of a local terminal, but may also include storage at a remote server, for example being accessed through a local area network or the Internet.

Correspondingly, the verification process may be conducted in a local terminal to obtain the verification result at the remote server. Or, information to a remote server, generating the verification result and then forwarding the result to the local terminal. Those skilled in the art should understand these variations.

"Information unit" refers to a unit composed of at least one piece of information. The information unit may be any one or a combination of "information elements," such as character, color, font, font size, graphics, pattern or even a sound wave. For example, an information unit may be a character, or the combination of a character and a color. Alternatively, the information unit may be the combination of a pattern and one or more colors. The information unit is not limited to the above example information elements. "Character" has its ordinary and customary meaning and may include, but is not limited to, Chinese characters, English characters, Arab numbers, Roman numbers and the like. The information unit may be embodied by the computer as a unique code. For example ASCII code may be used for representing a character. As such, comparison operation of these codes may be conducted mathematically.

Unless otherwise specified, "password" or "predefined password" as used throughout the specification, refers to a password preset by the user. The password is generally composed of several information units arranged according to a certain sequence, for example a string of characters, or characters with color. In addition the password is not limited to a plain text password. The inventor believes that person of ordinary skill in the art would completely understand above concepts when considering them.

Figure 1:
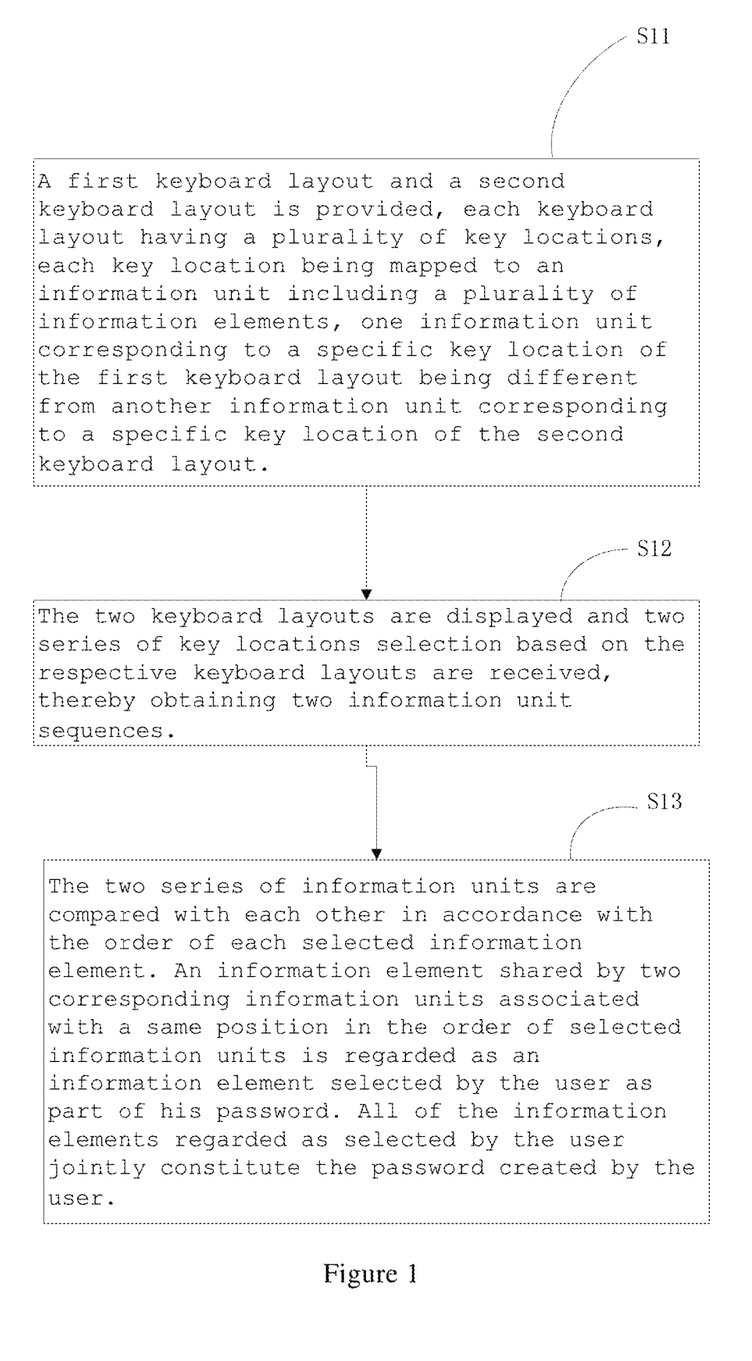
FIG. 1 illustrates schematically the principles of a password creating method of the invention.

As shown in FIG. 1, the present invention provides a password creating method which has the following principles:

In step S11, a first keyboard layout and a second keyboard layout is provided, each keyboard layout having a plurality of key locations, each key location being mapped to an information unit including a plurality of information elements, one information unit corresponding to a specific key location of the first keyboard layout being different from another information unit corresponding to a specific key location of the second keyboard layout.

A set of information elements for the purposes of password creation by the user is predefined. In an example, the password is a sequence of multiple characters, also called a password sequence. It is noted that the password sequence as used herein means a single password constructed of several characters other than a group of passwords. The information element may be any one or combination of characters, fonts, font sizes, colors, graphics, or patterns.

At first, the predefined set of information elements are divided into several information units. In addition, it should be ensured that the information elements contained in each information unit are different from each other and that at least two elements are contained in each information unit. The information units are distributed according to a predefined keyboard layout or randomly distributed and mapped to each key location of the keyboard layout. The number of the key locations is determined by the number of password characters set by a system according to a specific security requirement. The number of information units is the same as the number of key locations.

Next, the predefined set of information elements is redistributed. Again, it should be ensured that the information elements contained in each information unit are different from each other and that at least two elements are contained in each information unit. Furthermore, each information unit is different from the previously distributed information units. The quantity of the information units may be same as or different from that of the previously distributed information units. The several information units are mapped to respective key locations of the current keyboard layout according to the previous keyboard layout. Moreover, the several information elements corresponding to key locations of the previous keyboard layout are distributed to different key locations of the current keyboard layout.

In step S12, the two keyboard layouts are displayed and two series of key location selections based on the respective keyboard layouts, are received, thereby obtaining two information unit sequences.

The two keyboard layouts are displayed in a same user interface but at different times. For each given keyboard layout, each key location of the keyboard layout displays an information unit. The information units are displayed as graphics or as a collection of coded information elements in the user interface at the key locations of the keyboard layout. In this example, the user interface is a touch screen display which receives selections of key locations from the user pressing the user interface twice at different times. The pressing actions are transformed into commands for selecting specific display regions. When the user selects a key location of a specific keyboard layout of the user interface, the information unit associated with the key location is stored. By this manner, all of the information units selected by the user at the two different times are completely recorded.

As each information unit contains at least two information elements, fuzziness of the chosen information elements is improved during password creation by the user. As the information elements are displayed in the user interface, the user is able to press and select desired key locations on the touch screen display. The selection of a specific key location represents selection of a specific information unit containing multiple information elements. Further, each time the user makes a selection, the arrangement and combination of the information elements indicated in the display region at the first time may be different from the arrangement and combination of information elements in the display region at the second time, thereby improving fuzziness of the selected information elements. Even in case that the selection actions of the user are seen by others, the actual password sequence still cannot be known to those others, thereby enhancing security of the password creation process.

In step S13, the two series of selected information units are compared with each other in accordance with the order of each selected information unit. An information element shared by two corresponding information units associated with a same position in the order of selected information units is regarded as an information element selected by the user as part of his password. All of the information elements regarded as selected by the user jointly constitute the password created by the user.

The password created by the user is identified by comparison of two series of selected information units with each other in accordance with the order of each selected information unit.

According to the order of the user's inputs, the information units of each series are compared one by one. If it is found that two corresponding information units share a common information element, then this element is regarded as an information element selected by the user as part of his password. All of the information elements selected by the user jointly constitute a password desired by the user. If no information element is shared by two corresponding information units, then the password creation process ends.

Figure 2:
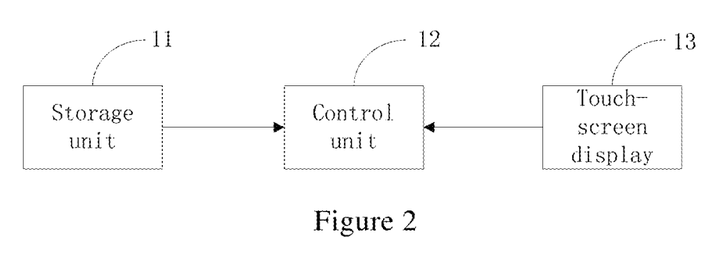
FIG. 2 schematically shows a block diagram denoting a password creating device for practicing the password creating method of the invention.

Referring to FIG. 2, a password creating device of the invention includes a control unit 11, a storage unit 12, and a touch screen display 13.

The control unit 11 serves to provide comprehensive control functions, and is mainly described herein as executing a program implemented by the password creating method of the invention, thus realizing password creation. The storage unit 12 is used for permanently or temporarily storing kinds of intermediate data generated during a process of executing the program, in accordance with the password creating method of the invention. For example, some or all of the predefined keyboard layout, the password created by the user, the candidate information units and the selected information units may be stored. The storage unit 12 may also store labels of the information units of the program. Those skilled in the art would understand that the password created by a user using the current method would be stored indefinitely (until it is changed by resetting the device). For the method of the invention, the program may flexibly determine whether other data should be stored by the storage unit 12. Accordingly, it should be understood that the storage technology used in current invention is by no means limited to the storage unit described herein. The touch screen display 13 is intended for providing various key locations each of which receives a press action of the user onto the key location and transforms the user's action into an instruction for selecting an information unit corresponding to the pressed key location. The information elements displayed at each key location are those contained in the information unit spatially related to the key location. Under the coordination of the control unit 11, the password creating device of the invention realizes a user-device interaction through use of the touch screen display 13. By this manner, the password creation operation is performed.

Figure 3:
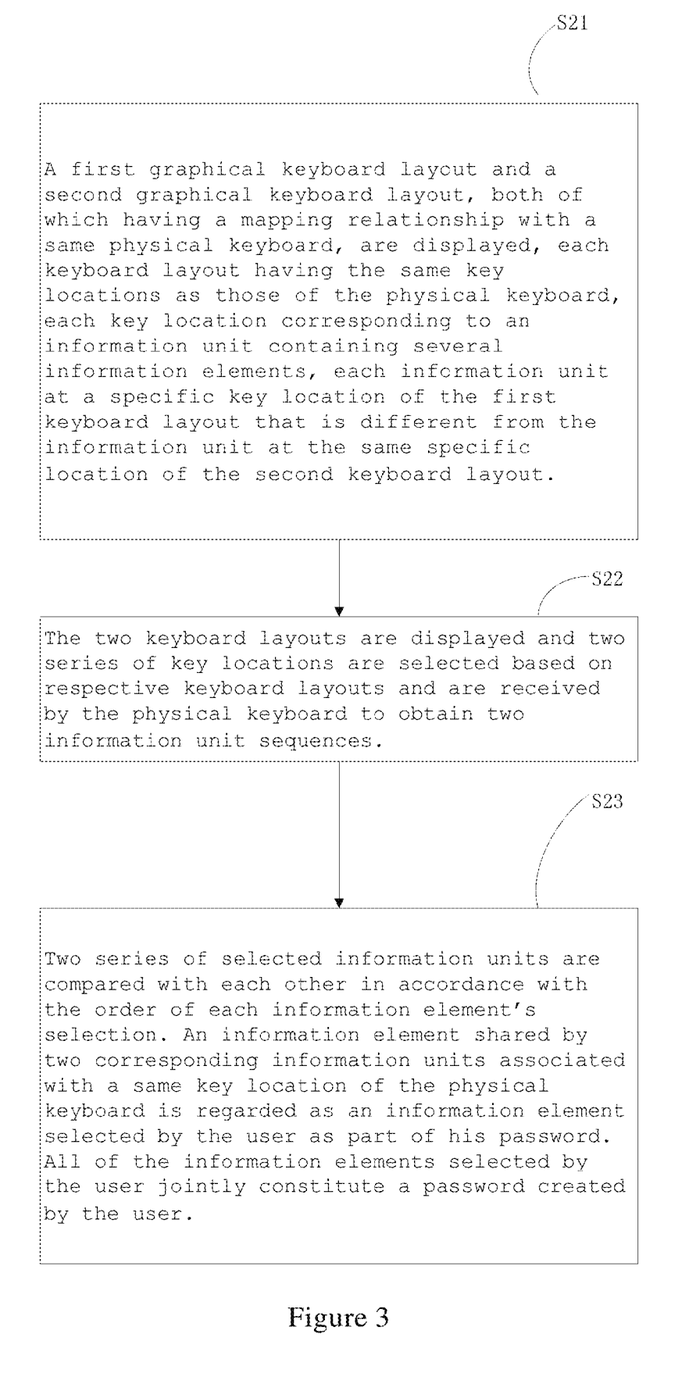
FIG. 3 illustrates schematically the principles of another password creating method of the invention.

As shown in FIG. 3, in applications such as ATMs and security boxes where physical keyboards exist, the present invention provides a password creating method, including the following steps:

In step S21, a first graphical keyboard layout and a second graphical keyboard layout, both of which have a mapping relationship with a same physical keyboard, are displayed, each keyboard layout having the same key locations as those of the physical keyboard, each key location corresponding to an information unit containing several information elements, each information unit at a specific key location of the first keyboard layout that is different from the information unit at the same specific location of the second keyboard layout.

The two different keyboard layouts are configured in advance, or are randomly generated by the set of information elements associated with the same physical keyboard; each key location of each keyboard layout being mapped to a respective key of the physical keyboard. The number of key locations of each keyboard layout is the same as that of the physical keyboard. As each key location of each keyboard layout corresponds to respective information unit including a plurality of information elements, the number of information units is the same as that of the keys of the physical keyboard. The information elements contained in the information units corresponding to each given key location of the two keyboard layouts are different from each other. Thus, the information unit at a specific key location of the first keyboard layout is different from the information at the same key location of the second keyboard layout. Also, the information elements at a specific key location of the first keyboard layout are randomly mapped to different key locations of the second keyboard layout.

In step S22, the two keyboard layouts are displayed and two series of key locations are selected based on respective keyboard layouts and are received by the physical keyboard to obtain two information unit sequences.

The two keyboard layouts are displayed in the user interface at different times. The display has the same layout as the physical keyboard, and the key locations on the display related to the mapping of the physical keyboard. The information units of the first keyboard layout and those of the second keyboard layout are shown in the same regions of the display at different times such that the user is able to make selection of corresponding key locations of the physical keyboard. For a specific keyboard layout, each key location displays an information unit. The information units are graphically displayed in the user interface as a collection of information elements at the key locations of the keyboard layout.

As each keyboard layout maps the physical keyboard to the corresponding regions of the display, the user can press keys of the physical keyboard to select the corresponding key locations and accordingly select the information units at the key locations. By two series of selections made by the user, two different sequences of information units are obtained.

In step S23, the two series of selected information units are compared with each other in accordance with the order of each information unit's selection. An information element shared by two corresponding information units associated with a same key location of the physical keyboard is regarded as an information element selected by the user as part of his password. All of the information elements selected by the user jointly constitute a password created by the user.

According to the selection order inputted by the user, two series of information units are compared one by one. If it is found that two corresponding information units share an information element, then this element is regarded as an information element selected by the user. All of the information elements selected by the user jointly constitute a password selected by the user. If no information element is shared by two corresponding information units, then the password creation process ends.

Figure 4:
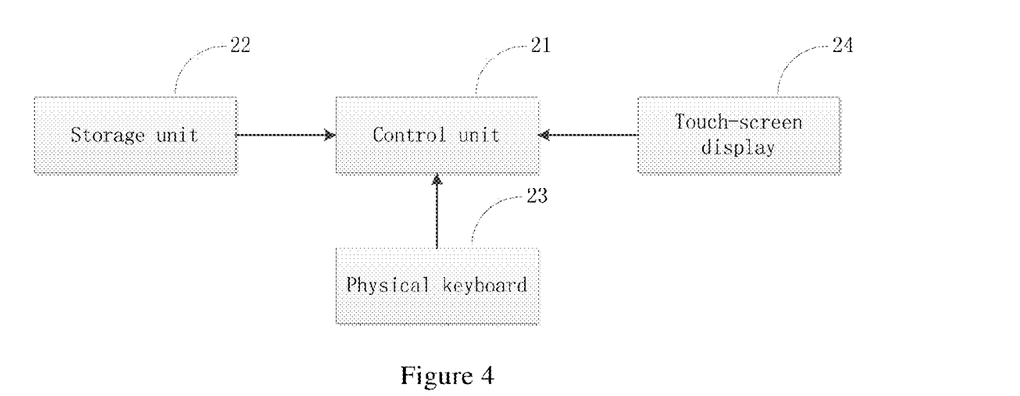
FIG. 4 schematically shows a block diagram denoting a password creating device for practicing the password creating method of the invention.

Following above method and as shown in FIG. 4, a password creation device is provided. The device includes a control unit 21, a storage unit 22, a physical keyboard 23, and a touch screen display 24. Here, The control unit 21 serves to provide comprehensive control functions and is mainly described herein as executing a program implemented by the password creating method of the invention, thus realizing password creation. The storage unit 22 is used for permanently or temporarily storing kinds of intermediate data generated during a process of executing the program in accordance with the password creating method of the invention. For example, some or all of the predefined keyboard layout, the password created by the user, the candidate information units and the selected information units may be stored. The storage unit 22 may also store labels of the information units of the program. Those skilled in the art would understand that the password created by a user using the current method would be stored indefinitely (until it is changed by resetting the device). For the method of the invention, the program may flexibly determine whether other data should be stored by the storage unit 22. Accordingly, it should be understood that the storage technology used in current invention is by no means limited to the storage unit described herein.

The physical keyboard 23 is a user-device interactive interface for providing to the user a keyboard layout having a number of physical keys corresponding to the layout of information units on the display 24, so that the user can select information units. The touch screen display 24 works to provide regions in which an information unit associated with a specific key location of the physical keyboard 23 is displayed. Thus the user is able to create his password based on the information units displayed on the display 24. Under coordination of the control unit 21, the password creating device of the invention realizes user-device interaction through use of the touch screen display 24. By this manner, the password creation operation is performed.

The password creating method of the invention may be practiced by executing by above device a program created according to the invention. The present invention is further illustrated with reference to figures and embodiments. To facilitate description, the information units associated with different keyboard layouts respectively are referred as to a first and second information units respectively in this embodiment.

First Embodiment

A predefined set of information elements P is stored in a storage unit. The set P contains digits 0-9, which are randomly divided into four subsets. Each subset is a collection of information elements and serves as a first information unit. Here, each information unit includes at least two different digits. Moreover, the information elements in one information unit are different from those of another information unit. As exhibited in Table 1, the set P is divided into four first information units as below:

TABLE 1

| first information units | |
|---|---|
| A (1, 3, 5) | B (2, 4, 9) |
| C (6, 7) | D (8, 0) |

Figure 5A:
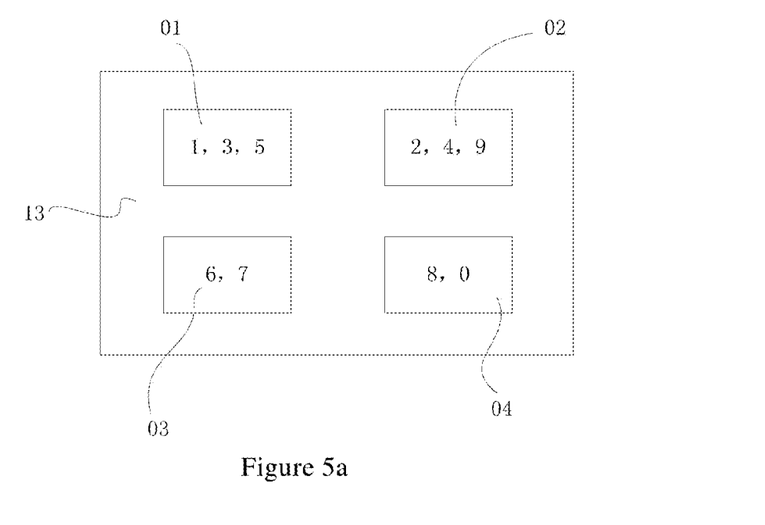
FIG. 5a shows a user interface corresponding to a first information unit according to an embodiment of the method of the invention.

As shown in FIG. 5a, the four first information units A, B, C, and D of Table 1 are shown in four predefined display regions 01, 02, 03, and 04 of a user interface. Here, A, B, C, and D may be directly displayed as images or as a group of characters. The four display regions of the user interface may appear stationary with their locations unchanged. Or, they may be dynamically presented with their locations changing over time. The four display regions may be pressed by the user, and the touch screen display transforms the user's pressing of a specific display region into a selection of that display region. The command is then is sent to the control unit. For example, if the password sequence (3, 2, 0, 1, 6, 7) is wanted by the user. By sequentially pressing the display regions 01-02-04-01-03-03, the first information units of Table 1 are chosen and stored by the storage unit as ABDACC. In addition, the information elements of each first information unit are also stored. For example, the first information unit A has information elements (1, 3, 5).

All of the information elements of the set P are then rearranged and distributed into four independent subsets each having at least two different information elements. Further, the information elements in one information unit are different from those of the other information units. The newly created four subsets are different from the first information units. Each newly created subset is a second information unit. The detailed distribution method is described below.

1. Randomly select a first information element based on all information elements of the set P.

2. Randomly select a second information element of the first subset based on the rest of the information elements of the set P, excluding the first selected information element. In addition, it is ensured that the first and second information elements were not included in the same one of the first information units.

3. Randomly generate a third information element of the first subset based on the rest of the information elements of the set P, excluding with the first and second selected information elements. In addition, it is ensured that the third information element was not included with either of the first and second information elements in a the same first information unit.

4. Distribute all of the information elements of the first subset of the second information units following the above rule.

5. Distribute all of the information elements of a second subset of the second information units in accordance with the above steps 1-4 and based on the set P, excluding all of the information elements of the first subset.

6. Distribute all of the information elements of a third and fourth subsets in accordance with the above steps 1-5.

Following the above method, the set P is divided into four second information units, for example, as below:

TABLE 2

| second information units | |
|---|---|
| A1 (4, 1, 6) | B1 (3, 8, 2) |
| C1 (0, 7) | D1 (9, 5) |

Figure 5B:
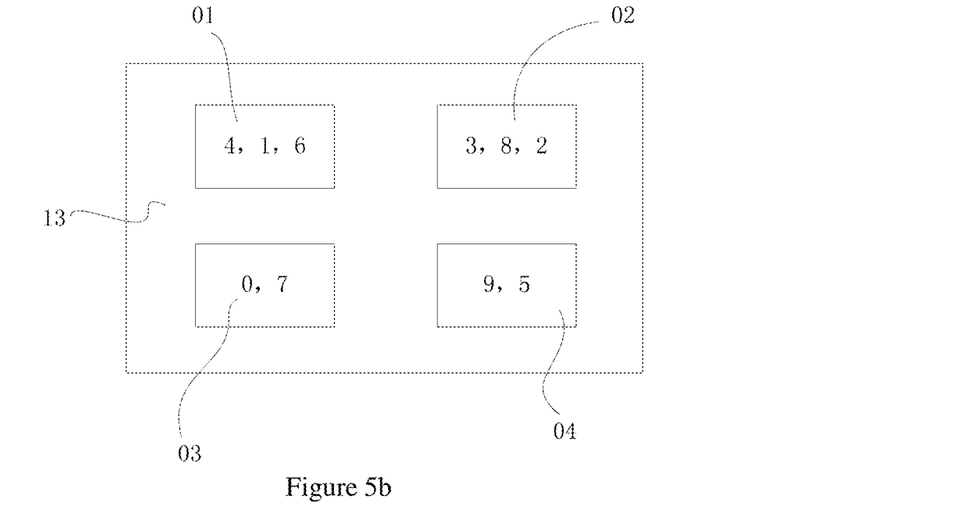
FIG. 5b shows a user interface corresponding to a second information unit according to an embodiment of the method of the invention.

As shown in FIG. 5b, the four second information units A1, B1, C1, and D1 of Table 2 are shown in four predefined display regions 01, 02, 03, and 04 of a user interface. Here, the display regions may be displayed as images or as a group of characters. The four display regions of the user interface may appear stationary with their locations unchanged. Or, they may be dynamically presented with their locations changing over time. The four display regions may be pressed by the user and the touch screen display transforms the user's pressing of a specific display region into a selection of that specific display region. The command is then is sent to the control unit. For example, if the password sequence (3, 2, 0, 1, 6, 7) is wanted by the user, the sequence may be selected by sequentially pressing the display regions 02-02-03-01-01-03. Thus, the second information units of Table 2 are chosen and are stored by the storage unit as B1B1C1A1A1C1. In addition, the information elements of each second information unit are also stored. For example, the second information unit A1 has information elements (4, 1, 6).

The first information units and second information units, all of which are stored in the storage unit, are compared with each other by the control unit according to their sequence of appearance. As shown in Table 3, a first information unit is compared with a corresponding second information unit, and the information element shared by the both units is taken as a password digit created by the user. For example, a first information unit A (1, 3, 5) and a corresponding second information unit B1 (3, 8, 2) share the same information element 3, and accordingly, the number 3 is regarded as a password digit selected by the user. Similarly, each subsequent first information unit is compared with a corresponding second information unit to determine the password sequence set by the user, which in this case is (3, 2, 0, 1, 6, 7). Next, the control unit may operate to display a floating window prompting the user that the password has been created successfully, and the control unit may store the password in the storage unit. If during the comparison it is found that no common information element is shared by a first information unit and a corresponding second information unit, then the password creation process is terminated, and the control unit operates to display a window indicating that the password creation failed.

TABLE 3 comparison of information elements

| | Label of first information unit | | | | | |
|---|---|---|---|---|---|---|
| | A | B | D | A | C | C |
| Information elements corresponding to the first information unit | 1, 3, 5 | 2, 4, 9 | 8, 0 | 1, 3, 5 | 6, 7 | 6, 7 |

| | Label of second information unit | | | | | |
|---|---|---|---|---|---|---|
| | B1 | B1 | C1 | A1 | A1 | C1 |
| Information elements corresponding to the second information unit | 3, 8, 2 | 3, 8, 2 | 0, 7 | 4, 1, 6 | 4, 1, 6 | 0, 7 |
| Created password sequence | 3 | 2 | 0 | 1 | 6 | 7 |

Second Embodiment

A predefined set of information elements P is stored in a storage unit. The set P contains digits 0-9, which are randomly divided into four subsets. Each subset is a collection of information elements and serves as a first information unit. Here, each information unit includes at least two different numbers. Moreover, the information elements in one information unit are different from those of another information unit. As exhibited in Table 4, the set P is divided into four first information units as below:

TABLE 4 first information units

| A (1, 3, 5) | B (2, 4, 9) |
|---|---|
| C (6, 7) | D (8, 0) |

Figure 6A:
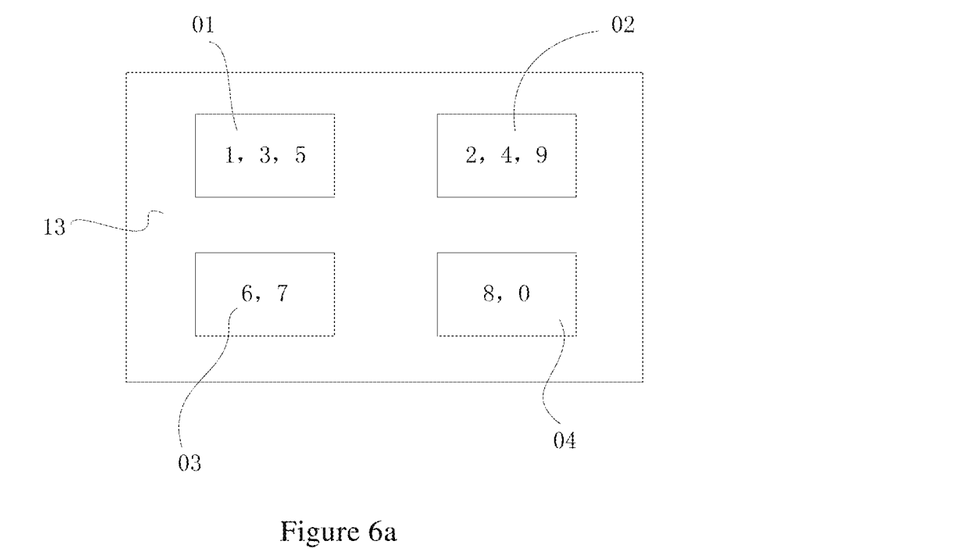
FIG. 6a shows a user interface corresponding to a first information unit according to an embodiment of the method of the invention.

As shown in FIG. 6a, the four first information units A, B, C, and D of Table 4 are shown in four predefined display regions 01, 02, 03, and 04 of a user interface. Here, A, B, C, and D may be directly displayed as images or as a group of characters. The four display regions of the user interface may appear stationary with their locations unchanged. Or, they may be dynamically presented with their locations changing over time. The four display regions may be pressed by the user and the touch screen display transforms the user's pressing of a specific display region into a selection of that specific display region. The command is then is sent to the control unit. For example, if the password sequence (3, 2, 0, 1, 6, 7) is wanted by the user, then the sequence may be selected by sequentially pressing the display regions 01-02-04-01-03-03. Thus, first information units of Table 4 are chosen and stored by the storage unit as ABDACC. In addition, the information elements of each first information unit are also stored. For example, the first information unit A has information elements (1, 3, 5).

All of the information elements of the set P are then rearranged and distributed into five independent subsets each having at least two different information elements. Further, the information elements in one information unit are different from those of the other information units. The newly created five subsets are different from the first information units. Each newly created subset is a second information unit. For example, as illustrated in Table 5, the set P may be redistributed into five second information units as shown below:

TABLE 5 second information units

| A1 (4, 1) | B1 (3, 8) |
|---|---|
| C1 (0, 7) | D1 (9, 5) |
| E (6, 2) | |

Figure 6B:
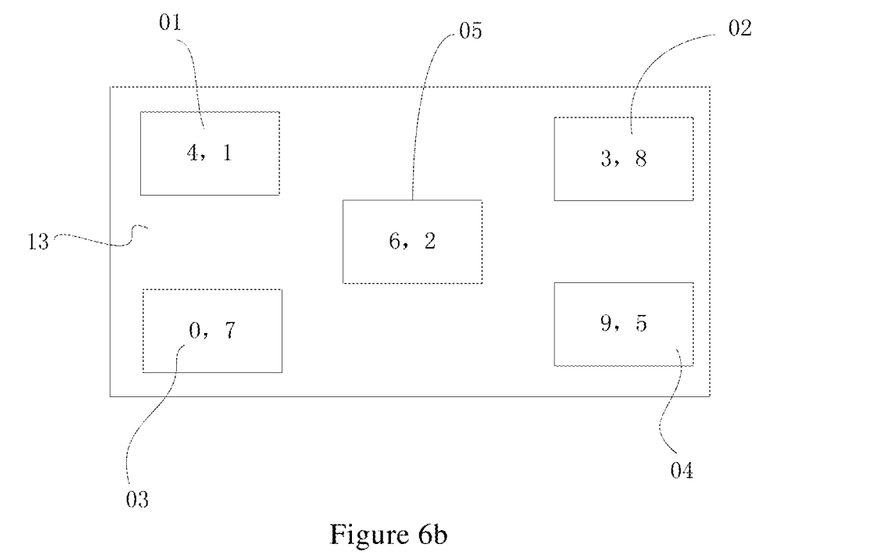
FIG. 6b shows a user interface corresponding to a second information unit according to an embodiment of the method of the invention.

As shown in FIG. 6b, the five second information units A1, B1, C1, D1, and E of Table 5 are shown in five predefined display regions 01, 02, 03, 04, and 05 of a user interface. Here, the display regions may be displayed as images or as a group of characters. The five display regions of the user interface may appear stationary with their locations unchanged. Alternatively, they may be dynamically presented with their locations changing over time. The five display regions may be pressed by the user and the touch screen display transforms the user's pressing of a specific display region into a selection of that specific display region. The command is then is sent to the control unit. For example, if the password (3, 2, 0, 1, 6, 7) sequence is wanted by the user, then the user may select this sequence by sequentially pressing the display regions 02-05-03-01-05-03. Thus, second information units of Table 5 are chosen and stored by the storage unit as B1EC1A1EC1. In addition, the information elements of each second information unit are also stored. For example, the second information unit A1 has information elements (4, 1).

The first information units and second information units, all of which are stored in the storage unit, are compared with each other by the control unit according to their sequence of appearance, as shown in Table 6. The first information unit is compared with the corresponding second information unit, and the information element shared by the both units is taken as a password digit selected by the user. For example, a first information unit A (1, 3, 5) and a corresponding second information unit B1 (3, 8) share the same information element 3, and accordingly, the number 3 is regarded as a password digit selected by the user. Similarly, the subsequent first information units are compared with the corresponding subsequent second information units to determine the password sequence set by the user, which in this case is (3, 2, 0, 1, 6, 7). Next, the control unit may operate to display a window prompting the user that the password creation and was successful, and the control unit may store the password in the storage unit. If in the course of the comparison it is found that no common information element is shared by a first information unit and its corresponding second information unit, then the password creation process is terminated. Then, the control unit operates to display a window indicating that the password creation failed.

TABLE 6 comparison of information elements

| | Label of first information unit | | | | | |
|---|---|---|---|---|---|---|
| | A | B | D | A | C | C |
| Information elements corresponding to the first information unit | 1, 3, 5 | 2, 4, 9 | 8, 0 | 1, 3, 5 | 6, 7 | 6, 7 |

| | Label of second information unit | | | | | |
|---|---|---|---|---|---|---|
| | B1 | E | C1 | A1 | E | C1 |
| Information elements corresponding to the second information unit | 3, 8 | 6, 2 | 0, 7 | 4, 1 | 6, 2 | 0, 7 |
| Created password sequence | 3 | 2 | 0 | 1 | 6 | 7 |

Third Embodiment

The information elements may be any one or a combination of characters, colors, fonts, font sizes, graphics, or patterns. A predefined set of information elements P may be stored in a storage unit. The set P contains numbers 0-9 and letters abb'cde (b and b' have different font type and therefore are different information elements), which are randomly divided into four subsets. Each subset is a collection of information elements and serves as an information unit. In this example, each information unit includes at least two different numbers. Moreover, the information elements in one information unit are different from those of every other information unit. Like in Table 4, the set P is divided into four first information units as below:

TABLE 7 first information units

| A (1, 3, 5, b) | B (2, 4, 9, c) |
|---|---|
| C (6, 7, a, d) | D (8, 0, e, b) |

Figure 7A:
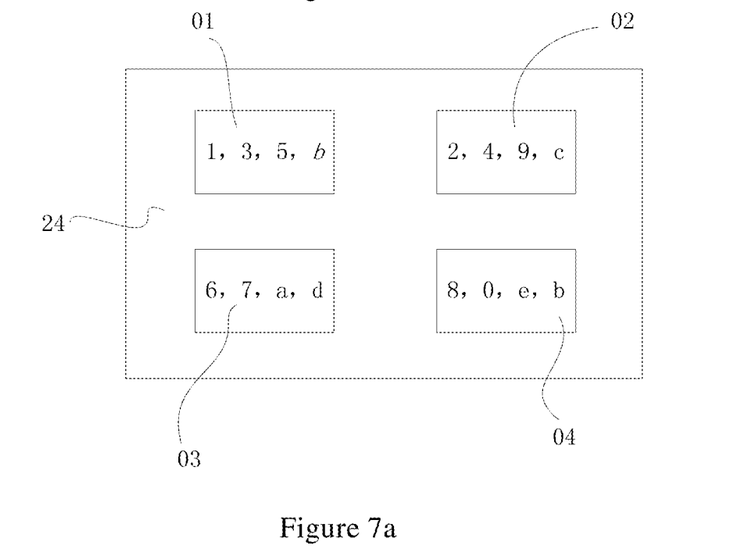
FIG. 7a shows a user interface corresponding to a first information unit according to an embodiment of the method of the invention.

As shown in FIG. 7a, the four information units A, B, C, and D of Table 7 are shown in four predefined display regions 01, 02, 03, and 04 of a user interface. Here, A, B, C, and D may be directly displayed as images or as a group of characters. The four display regions correspond to four respective keys (for example 1-4) of a physical keyboard, and accordingly are associated with different of input circuits. Switching a given input circuit on represents a selection of the displayed information unit corresponding to the same input circuit. The keys of the physical keyboard are pressed by the user and transform the user's pressing into a selection of a specific information unit. The selection is then provided to the control unit. For example, if the password sequence (5,2,a,1,b,7) is wanted by the user is, then the sequence may be selected by sequentially pressing the keys 1, 2, 3, 1, 1, and 3 corresponding to the respective display regions 01-02-03-01-01-03. Thus, the information units of Table 7 are chosen, and are stored by the storage unit as ABCAAC. In addition, the information elements of each information unit are also stored. For example, the information unit A has information elements (1, 3, 5, b).

All of the information elements of the set P are then rearranged and distributed into four independent subsets, each subset having at least two different information elements. Further, the information elements in one information unit are different from those of the other information units. The newly created four subsets are different from the first information units. Each newly created subset is a second information unit. For example, as illustrated in Table 8, the set P may be distributed into four second information units as shown below:

TABLE 8 second information units

| A1 (1, 2, 0, d) | B1 (5, 4, 6, b) |
|---|---|
| C1 (8, 7, c, b) | D1 (9, 3, e, a) |

Figure 7B:
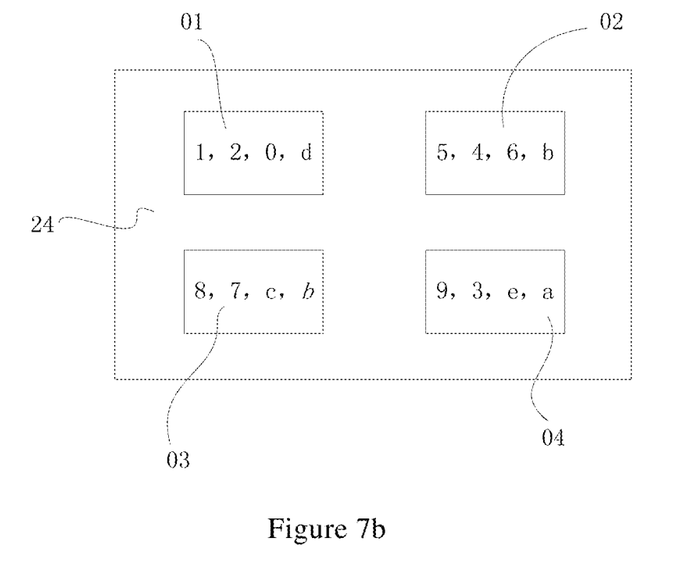
FIG. 7b shows a user interface corresponding to a second information unit according to an embodiment of the method of the invention.

As shown in FIG. 7b, the four second information units A1, B1, C1, and D1 of Table 8 are shown in four predefined display regions 01, 02, 03, and 04 of a user interface. Here regions A1, B1, C1, and D1 may be displayed as images or as a group of characters.

The four display regions correspond to four respective keys (for example 1-4) of a physical keyboard, and accordingly are associated with different input circuits. Switching a given input circuit on represents a selection of the displayed information unit corresponding to the same input circuit. The keys of the physical keyboard are pressed by the user and transform the user's pressing into a selection of a specific information unit. The selection is then provided to the control unit. For example, if the password sequence (5,2,a,1,b,7) is wanted by the user, then the sequence may be selected by sequentially pressing the keys 2, 1, 4, 1, 3, and 3 corresponding to the respective display regions 02-01-04-01-03-03. Thus, the second information units of Table 8 are chosen, and are stored by the storage unit as B1A1D1A1C1C1. In addition, the information elements of each second information unit are also stored. For example, the second information unit A1 has information elements (1, 2, 0, d).

The first information units and second information units, all of which are stored in the storage unit, are compared with each other by the control unit according to their sequence of appearance as shown in Table 9. The first information unit is compared with the corresponding second information unit, and the information element shared by the both units is taken as a password digit selected by the user. For example, a first information unit A (1, 3, 5, b) and a corresponding second information unit B1 (5, 4, 6, b) share the same information element 5, and accordingly, the number 5 is regarded as a password digit selected by the user. Similarly, the subsequent first information units are compared with the corresponding subsequent second information units to determine the password sequence set by the user, which in this case is (5, 2, a, 1, b, 7). Next, the control unit may operate to display a window prompting the user that the password creation was successful, and the control unit may store the password in the storage unit. If in the course of the composition it is found that no common information element its shared by a first information unit and a corresponding second information unit, then the password creation process is terminated. Then, the control unit operates to display a window indicating that the password creation failed.

TABLE 9 comparison of information elements

|  | Label of first information unit | | | | | |
|---|---|---|---|---|---|---|
|  | A | B | C | A | A | C |
| Information elements corresponding to the first information unit | 1, 3, 5, b | 2, 4, 9, c | 6, 7, a, d | 1, 3, 5, b | 1, 3, 5, b | 6, 7, a, d |

|  | Label of second information unit | | | | | |
|---|---|---|---|---|---|---|
|  | B1 | A1 | D1 | A1 | C1 | C1 |
| Information elements corresponding to the second information unit | 5, 4, 6, b | 1, 2, 0, d | 9, 3, e, a | 1, 2, 0, d | 8, 7, c, b | 8, 7, c, b |
| Created password sequence | 5 | 2 | a | 1 | b | 7 |

The information elements contained in any one of the first and second information units may vary flexibly and are not limited to numbers or letters as explained in the above embodiments. Further, the first and second information units may be generated according to a default keyboard layout or randomly. Regardless of the manner by which the information units are generated, all of the units are arranged randomly. Moreover, the information elements contained in each unit are arranged randomly. Moreover, the first and second information units are different from each other. As such, when the user inputs his password repeatedly, it will be greatly difficult for others to determine the password merely by analyzing the arrangement of the information units and the layout of the display regions, thereby enhancing security of the user's password.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. A method for creating a password on a device having a display, a user interface, a storage unit, and a control unit, the method comprising the following steps:
    generating and displaying a first and a second keyboard layout on the display, the first keyboard layout having a plurality of key locations, each key location corresponding to a respective information unit, each information unit comprising a plurality of information elements, each of the information units of the first keyboard layout being different from the other information units of the first keyboard layout, and the second keyboard layout having a plurality of key locations, each key location corresponding to a respective information unit, each information unit comprising a plurality of information elements, each of the information units of the second keyboard layout being different from the information units of the first keyboard layout and of the other information units of the second keyboard layout, wherein each information unit of the second keyboard layout comprises at most one information element in common with any information unit of the first keyboard layout;
    receiving, through the user interface, a first and a second series of user inputs, each user input selecting key locations of the first and second keyboard layouts, respectively;
    corresponding the selected key locations of the second keyboard layout to the selected key locations of the first keyboard layout in accordance with their order of selection;
    for each pair of corresponding selected key locations:
    comparing the information unit of the corresponding key locations with one another; and
    identifying a common information element shared by the compared information units;
    creating the password from the sequence of identified information elements; and
    storing the created password in the storage unit.

2. The method recited in claim 1, wherein generating each of the first and second keyboard layouts comprises randomly assigning the information elements to the information units at the key locations of the keyboard layout, and wherein the random assignment of information elements in the second keyboard layout is controlled to ensure that the information units of the second keyboard layout are different from the information units of the first keyboard layout, and that each information unit of the second keyboard layout contains at most one information element in common with any information unit of the first keyboard layout.

3. The method recited in claim 1, wherein the first keyboard layout is displayed prior to displaying of the second keyboard layout.

4. The method recited in claim 1, wherein an information unit mapped onto a specific key location of a corresponding keyboard layout is indicated in the same key location.

5. The method recited in claim 4, wherein the information unit is graphically displayed as an image or a collection of coded information elements.

6. The method recited in claim 5, wherein the information elements of each information unit are any one or a combination of characters, colors, fonts, font sizes, graphics, and patterns.

7. The method recited in claim 1, wherein the key locations of each keyboard layout appear in a fixed location of the display in a static manner.

8. The method recited in claim 1, wherein the key locations of each keyboard layout move around the display over time in a dynamic manner.

9. The method recited in claim 3, wherein selection of a specific key location by the user results in a click event to the same key location.

10. The password creating method as recited in claim 8, wherein the user interface is a touch-screen display.

11. A device comprising:
a controller for executing a program for creating a password;
memory for storing information units of selected key locations during execution of the program; and
a touch-screen display for providing said key locations and for receiving a pressing of the key locations from a user and converting the pressing into a selection of the information unit at the key location that is pressed,
wherein the controller is operable to:
generate and display a first and a second keyboard layout on the touch-screen display, the first keyboard layout having a plurality of key locations, each key location corresponding to a respective information unit, each information unit comprising a plurality of information elements, each of the information units of the first keyboard layout being different from the other information units of the first keyboard layout, and the second keyboard layout having a plurality of key locations, each key location corresponding to a respective information unit, each information unit comprising a plurality of information elements, each of the information units of the second keyboard layout being different from the information units of the first keyboard layout and of the other information units of the second keyboard layout, wherein each information unit of the second keyboard layout comprises at most one information element in common with any information unit of the first keyboard layout;
receive a first and a second series of user inputs, each user input selecting key locations of the first and second keyboard layouts, respectively;
correspond the selected key locations of the second keyboard layout to the selected key locations of the first keyboard layout in accordance with their order of selection;
for each pair of corresponding selected key locations:
compare the information unit of the corresponding key locations with one another; and
identify a common information element shared by the compared information units;
create the password from the sequence of identified information elements; and
store the created password in the memory.

12. A method for creating a password on a device having a display, a physical keyboard, a storage unit, and a control unit, the method comprising:
generating and displaying a first keyboard layout on the display, each key of the first keyboard layout corresponding to a respective key of the physical keyboard, the first keyboard layout having the same key arrangement as that of the physical keyboard, each key further corresponding to an information unit comprising a plurality of information elements, each of the information units being different from one another;
receiving at the physical keyboard, a first series of user inputs selecting key locations of the first keyboard layout;
generating and displaying a second keyboard layout on the display, each key of the second keyboard layout corresponding to a respective key of the physical keyboard, the second keyboard layout having the same key arrangement as that of the physical keyboard and the first keyboard layout, each key further corresponding to an information unit comprising a plurality of information elements, each of the information units of the second keyboard layout being different from the information units of the first keyboard layout and from the other in of the second keyboard layout, each information unit of the second keyboard layout comprising at most one information element in common with any information unit of the first keyboard layout;
receiving at the physical keyboard, a second series of user inputs selecting key locations of the second keyboard layout;
corresponding the selected key locations of the second keyboard layout to the selected key locations of the first keyboard layout in accordance with their order of selection;
for each pair of corresponding selected key locations:
comparing the information units of the corresponding key locations with each other; and
identifying a common information element shared by the compared information units;
creating the password from the sequence of identified information elements; and
storing the created password in the storage unit.

13. The method as recited in claim 12, wherein the first keyboard layout is displayed prior to displaying of the second keyboard layout.

14. The method recited in claim 13, wherein the information unit is graphically displayed at the display as an image or a collection of coded information elements.

15. The method recited in claim 12, wherein generating each of the first and second keyboard layouts comprises randomly assigning the information elements to the information units at the key locations of the keyboard layout, and wherein the random assignment of information elements in the second keyboard layout is controlled to ensure that the information units of the second keyboard layout are different than the information units of the first keyboard layout, and that each information unit of the second keyboard layout contains at most one information element in common with any information unit of the first keyboard layout.

16. The method recited in claim 12, wherein the information elements of each information unit are any one or a combination of characters, colors, fonts, font sizes, graphics, and patterns.

17. The method recited in claim 12, wherein selection of a specific key location of the physical keyboard is caused by a key-down or a key-up event.

18. A device comprising:
a controller for executing a program for creating a password;
memory for storing information units of selected key locations during execution of the method;
a physical keyboard comprising a plurality of keys for receiving user inputs, and converting a pressing of a given key into a selection of a corresponding information unit; and
a display for displaying information units corresponding to the keys of the physical keyboard,
wherein the controller is operable to:
generate and display a first keyboard layout on the display, each key of the first keyboard layout corresponding to a respective key of the physical keyboard, the first keyboard layout having the same key arrangement as that of the physical keyboard, each key further corresponding to an information unit comprising a plurality of information elements, each of the information units being different from one another;
receive a first series of user inputs selecting key locations of the first keyboard layout;

generate and display a second keyboard layout on the display, each key of the second keyboard layout corresponding to a respective key of the physical keyboard, the second keyboard layout having the same key arrangement as that of the physical keyboard and the first keyboard layout, each key further corresponding to an information unit comprising a plurality of information elements, each of the information units of the second keyboard layout being different from the information units of the first keyboard layout and from the other in of the second keyboard layout, each information unit of the second keyboard layout comprising at most one information element in common with any information unit of the first keyboard layout;

receive a second series of user inputs selecting key locations of the second keyboard layout;

correspond the selected key locations of the second keyboard layout to the selected key locations of the first keyboard layout in accordance with their order of selection;

for each pair of corresponding selected key locations:

compare the information units of the corresponding key locations with each other; and identify a common information element shared by the compared information units;

create the password from the sequence of identified information elements; and store the created password in memory.

19. The device recited in claim 11, wherein the controller is operable to randomly assign the information elements to the information units at the key locations of each keyboard layout, and to control the random assignment of information elements in the second keyboard layout to ensure that the information units of the second keyboard layout are different than the information units of the first keyboard layout.

20. The device recited in claim 11, wherein the controller is operable to map an information unit onto a specific key location of a corresponding keyboard layout in the same key location.

21. The device recited in claim 20, wherein the display is operable to graphically display each information unit as an image or a collection of coded information elements.

22. The device recited in claim 11, wherein the controller is operable to provide each of the key locations of the first and second keyboard layouts in fixed locations of the touch screen.

23. The device recited in claim 11, wherein the controller is operable to move each of the key locations of the first and second keyboard layouts around the touch screen over time.

24. The device recited in claim 18, wherein the controller is operable to display the first keyboard layout prior to displaying of the second keyboard layout.

25. The device recited in claim 24, wherein the controller is operable to graphically display each information unit as an image or a collection of coded information elements.

26. The device recited in claim 18, wherein the controller is operable to randomly assign the information elements to the information units at the key locations of each keyboard layout, and to control the random assignment of information elements in the second keyboard layout to ensure that the information units of the second keyboard layout are different than the information units of the first keyboard layout.

27. The device recited in claim 18, wherein the device is operable to convert a key-down or a key-up event of the physical keyboard as a selection of a specific key location.

28. The device recited in claim 18, wherein the keys of the physical keyboard are associated with input circuits, and switching on a input circuit of each key represents selection of the information unit associated with said key.

* * * * *